Feb. 9, 1937. J. F. GEARY 2,070,201
PROCESS FOR DEHYDRATING PULPS
Filed May 26, 1934 2 Sheets-Sheet 1
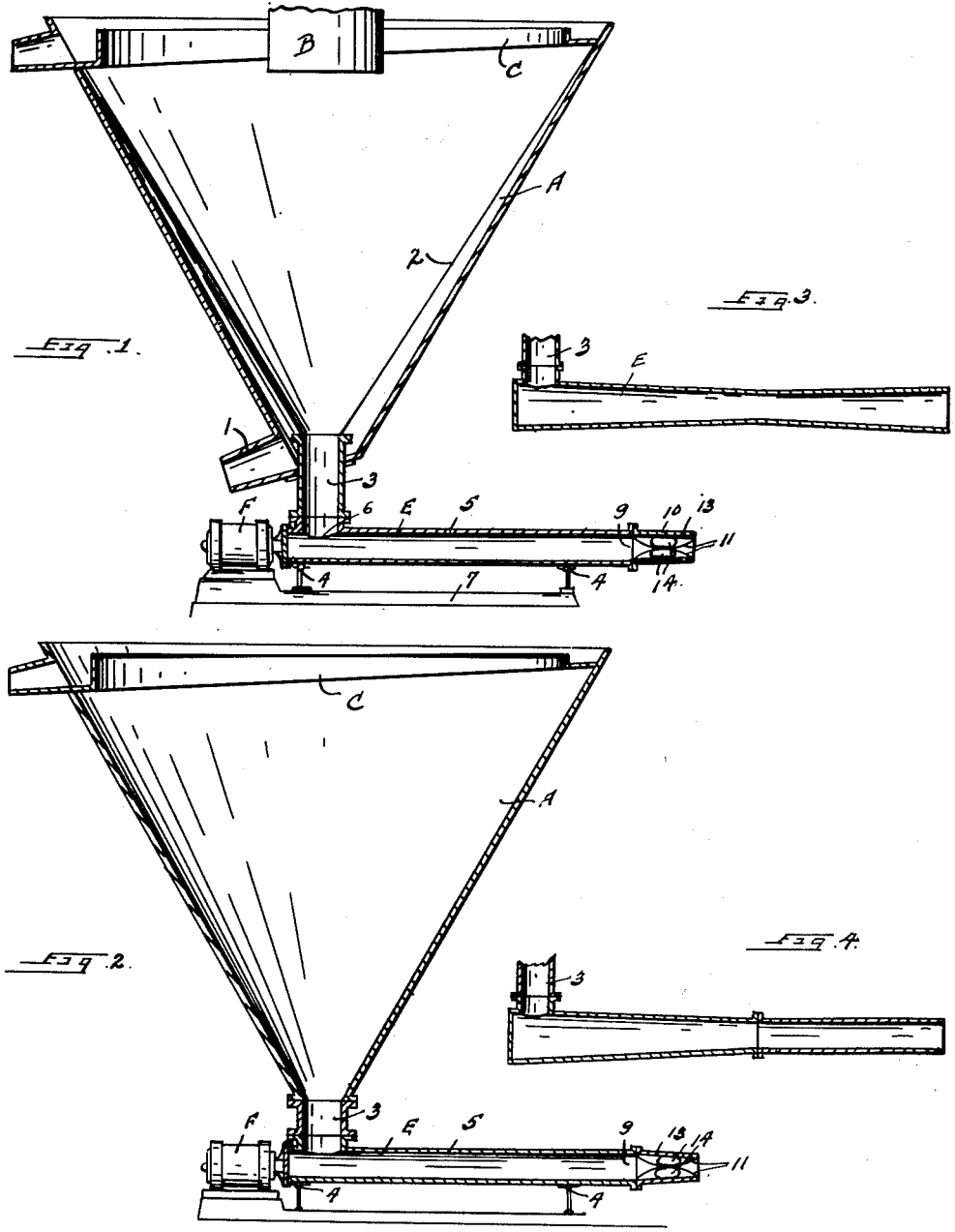
Inventor
James F. Geary
By R. M. Thomas
Attorney

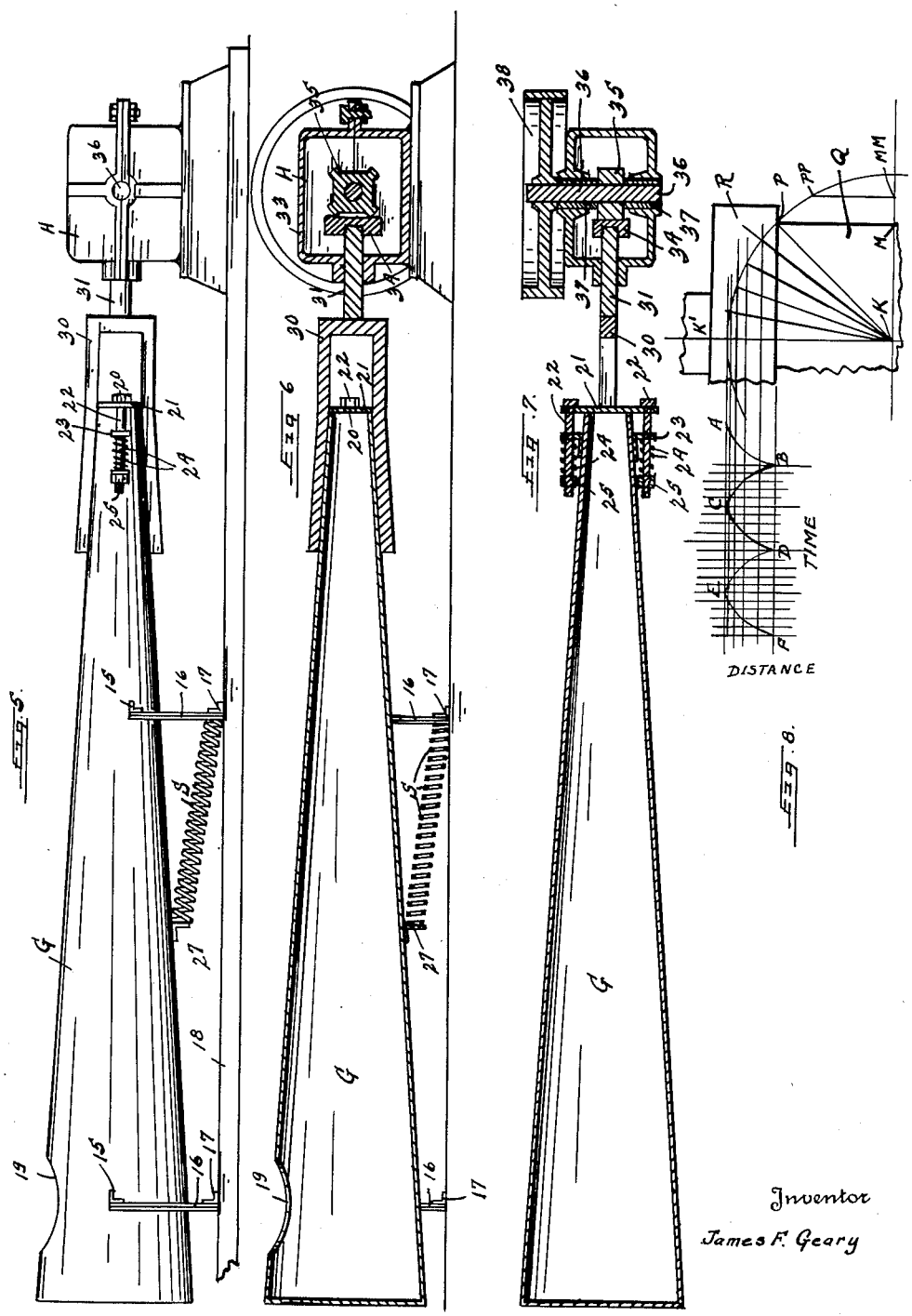

Patented Feb. 9, 1937

2,070,201

UNITED STATES PATENT OFFICE 2,070,201

PROCESS FOR DEHYDRATING PULPS

James F. Geary, Salt Lake City, Utah, assignor of one-fourth to De Witt Van Evera, Salt Lake City, Utah, and one-fourth to J. Wilbur Van Evera, Crosby City, Minn.

Application May 26, 1934, Serial No. 727,776

4 Claims. (Cl. 210—43)

This invention relates to dehydrating, drying, and dewatering devices, and its principal object is to provide a new and better method of separating solid particles from the liquid with which they are mixed. The process is applicable to solid-liquid mixtures such as ore pulps, sugar pulps, paper pulps, etc. In comparison with present dehydrating methods it will have the following advantages:

First: It will be less costly to install, per unit weight of pulp treated.

Second: It will be more efficient in its operation, that is to say, it will accomplish the same or a better result with a less amount of expended energy.

Third: It will produce a dryer "cake" or solid product.

In many present day industrial processes such as ore dressing, beet sugar manufacture, paper manufacture, sewage disposal, etc., it is frequently necessary, as a concomitant part of the process to separate solids from the liquid with which they are mixed. As a general rule, particularly in ore dressing operations, this solid-liquid separation is effected in two steps as follows:

Step 1.—The solid-liquid mixture, or pulp, from which solids are to be separated, is fed into a tank having a horizontal area relatively large in proportion to its vertical dimensions. Pulp in the tank is kept as free as possible from disturbance. This permits clear liquid to flow off the upper stratum of pulp in the tank and suspended solids to settle to the bottom of the tank, from which place they are withdrawn in the form of a thick sludge containing, usually, from 40% to 60% moisture.

Step 2.—This thick sludge is then brought into contact with a filter medium and pressure (usually air pressure) is applied to the sludge. The effect of this is to force the liquid portion of the sludge through the pores of the filter medium. The solids being too large to pass through said pores, are retained upon the filter medium in the form of a relatively dry "cake".

The two-step dewatering process described above is an expensive one both to install and to operate. In addition to the tanks and filters mentioned and other equipment such as prime moving and power transmission machinery, which is directly associated therewith, this two-step process frequently requires a large amount of indirectly associated accessory equipment, such as water pumps, sand pumps, air compressors, vacuum pumps, etc., which have to be purchased, operated and maintained.

The process described herein consists in passing the pulp through a device such as is shown in the accompanying drawings, in which similar numerals and letters of reference indicate like parts throughout the several views and as described in the specification forming a part of this application and pointed out in the appended claims.

In the drawings,

Figure 1 is a diagrammatic vertical section of one of the devices used in my process, showing the use of a filter medium in the receiving or settling cone of the device.

Figure 2 is a diagrammatic view of similar device showing a plain settling tank without filter medium.

Figure 3 is a sectional view of a compaction tube showing an enlarged part beyond the cross section of greatest construction.

Figure 4 is a sectional view of a compaction tube showing a cylindrical tube beyond the cross section of greatest constriction.

Figure 5 is a side elevation of a compaction tube removed from the settling cone of the device.

Figure 6 is a vertical section thereof.

Figure 7 is a horizontal section thereof.

Figure 8 is a curve showing the variation in velocity of a plunger R held in contact with and actuated by a four faced equal sided cam Q revolved at uniform speed about line K as a center.

The compaction tubes shown in Figures 5, 6, and 7 are tapered or frusto-conical with no extending end thereon.

Referring to Figure 1, the pulp enters the receiving cone or tank A of the device through a feed inlet B. The top of cone A is shown equipped with a launder or flume C to afford means of decanting off and disposing of clear liquids from the upper stratum of pulp in tank A. The bottom end of tank or cone A is provided with a discharge opening 1 through which filtrate may pass after having passed through the flexible suspended filter element 2. The bottom end of the cone-shaped filter element 2 is attached to a flexible tube 3 which in turn is connected to the compaction tube E of the device. Compaction tube E may take different forms depending upon the physical characteristics of the pulp being treated, the requirements of the particular operation, etc.

In Figures 1 and 2, I have shown this tube as a cylindrical tube 5 having an opening 6 on its top side, which opening connects with the end of the flexible tube 3. The tube 5 may be supported at suitable points along its length by slipper bearings 4, by suitable springs, or by other supports which will allow the tube to oscillate end ways. The supports are mounted on base 7 of the device. A vibrator F is rigidly mounted on base 7 and engages one end of the compaction tube E in such a manner as will permit the vibrator to exert force on tube E and cause it to move with a variable motion such as is described below and illustrated in Figure 8.

A discharge valve 10, which may be adjusted to offer more or less resistance to the passage of material through it, is rigidly connected to the discharge end 9 of the compaction tube. This discharge valve 10 consists of a flexible spool-shaped member 11 secured at each end to the inflexible tubular member 13, the tubular member 13 in turn being rigidly secured to the end of the compaction tube E. A flexible annular air tube 14, similar in shape to the inner tube of an automobile tire and similarly equipped with a suitable air valve, is carried around outside the flexible member 11 and inside the stiff tubular member 13. The annular air tube 14, when inflated with air to the proper degree of pressure, serves to hold the medial portion of member 11 closed against discharge from the compaction tube E until sufficient compactive pressure has been built up in the compaction tube E to overcome the resistance of the compressed air in air tube 14 and open the discharge valve, thus permitting the discharge of dried solids from the compaction tube. Solids are discharged upon a conveyor belt or directly into a railway car, storage bin or some similar container.

In Figure 2 the filter element is omitted and the top of cone A is equipped with a launder C to afford means of decanting off and disposing of clear liquid from the upper stratum of pulp in the tank. The flexible tube 3 connects directly to the end of the settling cone or tank A.

In Figures 5, 6, and 7 I have shown another form of compaction tube disconnected from the settling tank of the device.

In Figures 5, 6, and 7 compaction tube G is shown as a frusto-conical tube having support brackets 15 mounted on each side thereof. Said brackets 15 are rigidly secured to leaf type springs 16. The springs 16 are in turn rigidly secured to brackets 17 on the base 18 of the device. Different supports, which will permit a longitudinal oscillatory motion of the tube may be used.

The material is fed into the compaction tube through an opening 19 in the top of the large end of same, the small end being provided with a discharge resistance valve 20. This valve consists of a closure plate 21 carried on threaded bolts 22 which pass through brackets 23 secured to the sides of the end of the tube G. The bolts 22 carry suitable compression springs 24 which are compressed between the nuts 25 and the brackets 23 to hold the discharge valve closed, normally, and provide means for adjustment of the pressure required to open same.

A tension spring S normally holds the compaction tube, through other reciprocating members of the device, in contact with a vibrator H. One end of spring S is attached to the base 17 and the other end to a bracket 27 on the under side of compaction tube G. The vibrator may be used at either end of the compaction tube, the requirement in this connection being that it produce in the tube the type of motion necessary, but in Figures 5, 6, and 7, it is shown attached to the small end of the tube G by a yoke 30, the legs of the yoke being rigidly attached to the tube. A shaft 31 extends into the vibrator housing 33 and a contact block 34 is attached to the end of the shaft 31 within the housing 33. The outer end of the shaft engages the yoke 30 to impart motion thereto. The block 34 engages the cam 35. The cam 35 is shown to be square in cross section; a cam triangular in cross section would serve equally as well as the square cam and a cam with any number of faces would be operative. The cam 35 is mounted on a shaft 36 which is carried in suitable bearings 37 in the housing 33. A drive pulley 38 is mounted on one end of the shaft 36 to actuate the cam and produce motion in the device. Oil is carried in the housing 33 to keep the vibrator mechanism lubricated. Any suitable source of power may be applied to pulley wheel 38 to drive the device.

The process of treating the pulp is as follows:

Referring to Figure 1, which illustrates that form of device best adapted for use in separating a solid of low specific gravity from a liquid, the pulp to be treated enters the device through feed inlet B. Due to the presence of the flexible suspended filter element 2 in the receiving or settling cone A, and the ability of the cone to discharge from its bottom the liquids which have passed through the filter element, a current of pulp moves continuously downward through the tank A. The liquid portion of the pulp meets and passes on through the filter element 2, is guided by cone A to discharge opening 1 and thence passes away from the device. Under certain conditions, for example; when treating a pulp with a relatively large liquid content, it may be desirable to use an overflow launder or flume C as a supplemental means of removing a portion of clear liquid from the device. Launder C, if used, is installed preferably with one edge level and lower than the other edge. The thin ring-shaped film of liquid laying on the top of the pulp in the tank contiguous to launder C, due to settlement of solids downward, will be substantially clear of solids provided the tank is not fed with more pulp than it can handle. This clear liquid film, therefore, may be decanted off continuously, that is to say it may be allowed to overflow the level edge of launder C and pass off therethrough. The above downward moving current, aided by gravity, carries the solid particles of the pulp into contact with filter element 2, but these solid particles, on account of their size, being unable to pass through the pores of the filter medium, are momentarily retained upon its surface. This surface is steeply inclined, which condition, together with the fact that the filter medium is subjected to continuous agitation by the rapidly vibrating compaction tube E to which through tube 3 it is attached, tends to dislodge solids which might otherwise cling to the element. Solids thus hindered from passing through the filter medium and away from the device with the above mentioned filtrate, settle gradually downward and eventually, impelled by gravity, find their way through flexible tube 3 into compaction tube E. Compaction tube E is subjected to a continuous, rapidly repeated, oscillatory or reciprocating motion, the characteristics of which are, that the tube in one direction of travel, let us say the forward direction, moves with an accelerating velocity and stops suddenly to reverse its direction of travel, while in the opposite or backward direction of travel, it moves with a decelerating velocity and reverses its direction of travel slowly. Such a motion is illustrated in Figure 8, which shows the variation in velocity of a plunger R held in contact with and actuated by a four sided cam Q, which is revolved at uniform speed about line K as a center. A study of Figure 8 will bring out the fact that, since the cam is rotated at uniform speed, radius KP of the cam passes through equal angular distances in equal intervals of time; also the fact that plunger R, moving back and forth on line KK', traverses unequal linear distances along this line in said equal intervals of time. The curve of this motion in which time is plotted along the axis of abscissa and distance moved by plunger along the axis of ordinates, illustrates clearly the plunger's variation in velocity of travel. Although a four sided cam is used to illustrate and explain this motion, any multiple faced cam may be used to produce it.

The curve shown in Figure 8 is to be regarded merely as explanatory or illustrative of the type of motion under discussion. A motion may be capable of accomplishing the results desired in the process and yet not conform with this curve. For example, if for edge P of cam Q, we substitute an arc P—PP of the circle which radius is KP, or to put the assumption in other words, if we move cam face PM up to position PP—MM, a curve of the motion resulting from the rotation of such a cam at uniform speed about line K as a center, would show the velocity of the plunger to be zero for a length of time, depending upon the length of arc P—PP, in the vicinity of points A, C, E, etc., in the curve. Yet the motion produced by such a cam would accomplish the results desired in compaction tube E equally as well as the sharp edged cam shown in Figure 8.

The effect of the variable motion described above on solid objects subjected to it, is to cause them to progress continuously and rapidly, according to the rapidity of the applied oscillatory strokes, in that direction of travel at the end of which the sudden stop or sharp reversal of direction of travel occurs. To picture this effect more clearly, let us assume that a solid object, such as a large stone or boulder be placed in the open bed of an ordinary wagon and the wagon started gently down hill. If the wagon is started gently enough there will be no appreciable movement of the boulder, with respect to the wagon. Due to the acceleration of gravity, the wagon unless retarded by friction or otherwise, will gain speed. When a high rate of speed is attained, let us assume that the wagon is brought to a sudden stop by impact with an obstruction, or by other means. Due to its inertia, the boulder will continue to move onward and force will be required to stop it, such force being proportional to the mass of the boulder and its acceleration at the moment of impact. If we substitute for the bed of the wagon, in the foregoing illustration, a closed container such as a tank, and assume that the tank be filled with a liquid such as water, and that the boulder be placed in this water filled tank, the same effect will occur upon impact as occurred in the first illustration, that is the boulder will continue onward in its course, this time through the water in the tank. If numerous boulders be placed in the tank all of them will be projected onward in their course upon sudden stoppage of the container, and will be brought to rest only by the application of a force, which we will assume the forward wall of the tank capable of exerting. If we now substitute for the boulders a large number of smaller particles of solid material, the same action will take place; each particle upon sudden stoppage of its container, will tend to continue onward in its course as did each boulder. If the velocity of the particles, at the moment of impact or stoppage, be high enough, and they are brought to rest in a sufficiently short space of time internal pressure will be created in the mass of particles when they are brought to rest, particularly in the forward part of the mass directly in contact with or close to that wall of the tank the immovability of which brought the mass to rest. The degree of pressure thus created is expressed by the equation, $$F = \frac{WV}{ta} \qquad (1)$$

in which F=force in pounds
W=weight of body in pounds
V=velocity of moving body, in feet per second
$a$=acceleration due to gravity
and $t$=time Equation (1) above, was worked out by standard mathematical methods from the well known law of mechanics, $$F = Ma \qquad (2)$$

in which M=mass of body and F and $a$ are as stated under Equation (1).

It should be evident from the foregoing explanation that liquids can be expelled or excluded from a mass of solids manipulated in the above manner, the only requirement being that, the internal pressure, or "compactive pressure", built up in the mass by such manipulation, be sufficiently high. It is evident also from Equation (1) that the creation of a sufficiently high compactive pressure is merely a matter of moving the mass of solid material fast enough and stopping it quickly enough.

In the above manner, the compaction tube used in my process completes the process of separating solids from liquids. It will of course be understood that, the single accelerated movement ending in a sudden stop, used for explanatory purposes above, is continuously and rapidly repeated in my process, making said process substantially a continuous one.

Solids thus freed from liquids are removed from the device in a substantially continuous manner by utilizing a part of the force generated by the velocity and sudden stoppage of the solid mass to open a discharge valve and thus permit ejection of the dried solids. The discharge valve should offer a certain amount of resistance to the passage of material through it in order to compress or compact the solids and thus expel moisture from them before discharge takes place, and the valve should preferably be so constructed as to permit adjustment of the degree of resistance offered. Any valve conforming to these requirements can be used. It need not necessarily be automatic in its action, as are both the air controlled valve and the spring controlled valve described above and shown in Figures 1, 2, 5, 6 and 7. An open hole, closed against discharge, by a plug of some such material as wood, rubber, or the solid particles of the pulp undergoing treatment, until the action of the compaction tube builds up a compacted mass of solids behind the plug and pushes it from place, such a device will be operative provided, the compaction tube is conical in shape or for some other reason has the ability to offer resistance to the free exit of material from the tube.

Dried solids ejected from the compaction tube in the manner described above are finished products of this process.

Figure 2 illustrates another form of the device used in this process. This form of device is best adapted for use on pulps with a relatively low moisture content and the solids of which tend to settle readily. In this form of device no filter medium is used in connection with settling tank A. It will at once be evident therefore, that launder C, or some equally serviceable means of disposing of the liquid products of the process is necessary. The pulp in the settling tank A of this device differs but slightly in its action from that described above in connection with the device shown in Figure 1. In the device shown in Figure 2 no downwardly moving current of pulp tends to speed the settling of solid particles into compaction tube E; they have to find their way there solely by the action of gravity. All of the clear liquid product resulting from the operation of this form of device must pass away through launder C. The solid product is formed in exactly the same manner as described above in connection with the form of device shown in Figure 1. In this form of device, as well as in that form shown in Figure 1, the action of the process is substantially continuous, a continuous flow of pulp being fed into tank A for treatment, a continuous flow of liquids from which solids have been separated being conveyed away from the device by means of launder C, discharge spout, or both, and a series of ejections of solids, so rapidly repeated as to be continuous in practical effect, taking place from compaction tube E.

It will be obvious that, modifications may be made in the mechanical apparatus used in this process without departing from the spirit of the invention or the scope of the claims.

Having thus described my invention I desire to secure by Letters Patent and claim:

1. A dehydrating or drying process for solid-liquid mixtures or pulps, comprising settling the solid particles from the pulp in a settling tank equipped to permit drawing off the liquid portion of the pulp; directing the settled solids into a container and moving the container in such a manner as to cause said solid particles within it to progress toward one end of the container and be compacted therein.

2. A dehydrating or drying process for solid-liquid mixtures or pulps, comprising settling the solid particles from the pulp in a settling tank equipped with means to permit removal of the liquid product resulting from the operation of the process, directing the settled solids into a container and subjecting said container to a reciprocating motion capable of projecting the solids toward one end of the container and compacting them there with sufficient pressure to exclude moisture.

3. A process of treating pulp which comprises, settling the solids from the liquids in a settling tank; and compressing the solids in one end of a compaction tube by subjecting the tube to a reciprocating motion in the end of the tube and force them therefrom when they are dried.

4. A compaction process for treating pulps, comprising placing the pulp in a suitable container and subjecting the container to an accelerated motion in one direction, bringing the container to a quick stop, subjecting the container to a decelerated motion in the opposite direction and repeating the cycle of movements continuously.

JAMES F. GEARY.